United States Patent
Purba (10) Patent No.: US 11,288,562 B2
(45) Date of Patent: Mar. 29, 2022

(54) SYSTEM AND METHOD FOR LOCATION TRACKING

(71) Applicant: Landcar Management, Ltd., Sandy, UT (US)

(72) Inventor: Yan Purba, Draper, UT (US)

(73) Assignee: Landcar Management, Ltd., Sandy, UT (US)

( * ) Notice: Subject to any disclaimer, the term of this patent is extended or adjusted under 35 U.S.C. 154(b) by 0 days.

(21) Appl. No.: 15/809,783

(22) Filed: Nov. 10, 2017

(65) Prior Publication Data
US 2019/0147311 A1 May 16, 2019

(51) Int. Cl.
| | | |
|---|---|---|
| G06K 19/07 | (2006.01) | |
| G06K 19/077 | (2006.01) | |
| H04W 4/029 | (2018.01) | |
| G06K 19/04 | (2006.01) | |

(52) U.S. Cl.
CPC ..... *G06K 19/07713* (2013.01); *G06K 19/047* (2013.01); *G06K 19/0723* (2013.01); *H04W 4/029* (2018.02)

(58) Field of Classification Search
CPC .......... G06K 19/07713; G06K 19/047; H04W 4/029
See application file for complete search history.

(56) References Cited

U.S. PATENT DOCUMENTS

| | | |
|---|---|---|
| 8,023,895 B2 | 9/2011 | Smith |
| 8,115,609 B2 | 2/2012 | Ketari |
| 8,594,616 B2 | 11/2013 | Gusikhin et al. |
| 8,847,754 B2 | 9/2014 | Buchheim et al. |
| 9,020,687 B2 | 4/2015 | Mendelson |
| 9,084,215 B2 | 7/2015 | Honkanen et al. |
| 9,420,401 B2 | 8/2016 | Rao et al. |
| 9,507,977 B1 | 11/2016 | Mor et al. |

(Continued)

FOREIGN PATENT DOCUMENTS

CN 203391730 U 1/2014

OTHER PUBLICATIONS

Tile; "Find Your Keys, Wallet & Phone with Tile's App and Bluetooth Tracker Device"; (2016); 3 pages; [retrieved on Apr. 7, 2017]; Retrieved from <URL: https://www.thetileapp.com>.

(Continued)

*Primary Examiner* — Curtis B Odom
(74) *Attorney, Agent, or Firm* — Thorpe North & Western, LLP (57) ABSTRACT

A system and method for location tracking using Bluetooth Low Energy tracking devices or tags having a button, a light, a sound generating buzzer, and a user replaceable battery are disclosed. The system may include one or more Bluetooth receiving units, which may be user mobile devices, programmed to receive a signal from one of the tracking devices and send the location of the tracking device to the system. The advertising interval or transmission frequency of the tracking devices may be raised or lowered to either increase the location precision or extend the battery life of the tracking devices. In one embodiment, tracking devices may be attached to automobile keys and the automobile's vehicle identification number may be associated with the corresponding tracking device, to allow an automobile dealership to manage the location of a large quantity of keys.

6 Claims, 5 Drawing Sheets

(56) References Cited

U.S. PATENT DOCUMENTS

| | | | |
|---|---|---|---|
| 9,514,630 B1 | | 12/2016 | Steven |
| 9,602,193 B1 | | 3/2017 | Mendelson |
| 2004/0113776 A1 | * | 6/2004 | Goggin ............... G08B 21/023 340/539.32 |
| 2009/0237209 A1 | | 9/2009 | Seal et al. |
| 2010/0094482 A1 | * | 4/2010 | Schofield ............... G08G 1/205 701/2 |
| 2011/0210849 A1 | * | 9/2011 | Howard ............. G08B 21/0269 340/539.32 |
| 2012/0223834 A1 | | 9/2012 | Hyatt |
| 2014/0256304 A1 | | 9/2014 | Frye et al. |
| 2016/0142868 A1 | | 5/2016 | Kulkarni et al. |
| 2016/0335877 A1 | * | 11/2016 | Steven ................... G08B 21/24 |
| 2016/0335878 A1 | | 11/2016 | Steven |
| 2017/0213233 A1 | * | 7/2017 | High ..................... G06Q 20/20 |

OTHER PUBLICATIONS

Trackr Inc.; "Find more. Search less"; Track your phone, wallet, keys & anything else with TrackR!htm.; (2017); 15 pages; [retrieved on Apr. 7, 2017]; Retrieved from <URL: https://www.thetrackr.com>.

Wirecutter; "The Best Bluetooth Tracker"; Wirecutter: Reviews for the Real World; (Oct. 6, 2017); 18 pages; [retrieved on Apr. 7, 2017]; Retrieved from <URL: http://thewirecutter.com/reviews/best-bluetooth-tracker/>.

* cited by examiner

SYSTEM AND METHOD FOR LOCATION TRACKING

FIELD OF THE TECHNOLOGY

The present technology relates to tracking the location of an object using Bluetooth Low Energy to deliver location information from a tracking device to a tracking system.

BACKGROUND OF THE TECHNOLOGY AND RELATED ART

In recent years, tracking systems have been developed to monitor and convey the location of tracked objects using various technological protocols. As mobile devices and wireless internet networks have become ubiquitous, tracking systems have advanced to take advantage of such devices and networks for communicating the location of an object to a system, and consequently to a user. One use for these tracking systems is to locate lost or stolen items. A user may attach a tracking device to an item, and the device may communicate its location to the system through one of a variety of communication protocols.

Such location tracking may be particularly useful for business with the need to keep track of certain items. For example, automobile dealerships use large quantities of automobile keys on a regular basis to open and close automobiles for potential buyers and to provide test drives to potential buyers. The keys of similar automobiles often appear nearly identical, especially when dealing with keys from the same automobile manufacturer. Distinguishing which set of keys belongs to which vehicle may be difficult. In addition, the large number of individuals with access and potential need to use and move automobile keys at a dealership leads to an increased risk that keys become lost.

Some tracking systems have sought to provide tracking devices that use Global Positioning System, or GPS, to communicate the location of an item to the system. However, GPS tracking devices may have significant power requirements that often result in the need for large batteries relative to the desired size of the tracking devices. Furthermore, the constant power requirements often result in the need for recharging batteries or frequent replacement of non-rechargeable batteries.

Other prior art devices have sought to solve some of the identified deficiencies by using Bluetooth Low Energy (LE) to communicate between tracking devices and networks. These Bluetooth LE systems most often require a tracking device to be paired via Bluetooth to an end user device, such as a mobile phone. Through a constant connection with the paired device, Bluetooth trackers can periodically update the paired device with the tracker location. However, a single paired device may face limitations on the number of trackers that can be paired and managed from the device. Due to the inefficiencies associated with prior art location tracking systems, a need exists for improved systems and methods of location tracking.

BRIEF DESCRIPTION OF THE DRAWINGS

The present technology will become more fully apparent from the following description and appended claims, taken in conjunction with the accompanying drawings. Understanding that these drawings merely depict exemplary aspects of the present technology they are, therefore, not to be considered limiting of its scope. It will be readily appreciated that the components of the present technology, as generally described and illustrated in the figures herein, could be arranged and designed in a wide variety of different configurations. Nonetheless, the technology will be described and explained with additional specificity and detail through the use of the accompanying drawings in which:

DETAILED DESCRIPTION OF EXEMPLARY ASPECTS

The following detailed description of exemplary aspects of the technology makes reference to the accompanying drawings, which form a part hereof and in which are shown, by way of illustration, exemplary aspects in which the technology may be practiced. While these exemplary aspects are described in sufficient detail to enable those skilled in the art to practice the technology, it should be understood that other aspects may be realized and that various changes to the technology may be made without departing from the spirit and scope of the present technology. Thus, the following more detailed description of the aspects of the present technology is not intended to limit the scope of the technology, as claimed, but is presented for purposes of illustration only and not limitation to describe the features and characteristics of the present technology, to set forth the best mode of operation of the technology, and to sufficiently enable one skilled in the art to practice the technology. Accordingly, the scope of the present technology is to be defined solely by the appended claims.

The following detailed description and exemplary aspects of the technology will be best understood by reference to the accompanying drawings, wherein the elements and features of the technology are designated by numerals throughout. The present technology describes a system and method for location tracking. In an embodiment, a Bluetooth Low Energy (LE) tracking device is provided. The device location may be displayed on a live map, and an alert may be sent to the tracking device to activate an audible or visible alert on the tracking device so that it can be located. A system and method suitable for managing large quantities of tracked items will be described in detail. The system and method may be specifically configured to associate an identification number of a tracking device to a tracked item in order to facilitate retrieval of the location based on a request for the tracked item. In an embodiment, the system and method are used by an automobile dealership to track and locate automobile keys.

In one aspect of the present disclosure, the tracking device may be a Bluetooth LE proximity tag that may have a button, a light, a sound generating buzzer, and a user replaceable battery. The tracking device may default to a sleep mode setting, where the battery is in place but the device is not transmitting. The tracking device may be activated by pressing the user button, after which the device will begin a continuous advertise or transmission mode at a certain interval, such as once every 250 milliseconds. The advertising interval may be adjusted by the system of the present disclosure, where increasing the interval or frequency of transmission may lead to more accuracy or greater discoverability and decreasing the interval or frequency of transmission may conserve battery. For example, the advertising interval may be adjustable within a range of once every 100 milliseconds to 2500 milliseconds. The adjustments may be made through a user interface as part of a mobile or desktop application for managing the overall system or for users of the specific tracking devices, as explained herein in greater detail.

The tracking device of the present disclosure may include a sound generating buzzer or other sound generating component, and a light component, such as an LED. The buzzer and LED may be activated as part of an alert from a user mobile device, which may facilitate location of items that are out of sight but known to be in a specific location. Alert activation may also allow a user to distinguish between multiple tracked items, for example, multiple sets of automobile keys that are in a drawer, a pile or hanging in a row. The LED may also function as an alert when the battery level reaches a certain point and replacement is soon to be required. For example, the LED could be programmed to activate, either constantly on or in a flashing mode, for example every 4 seconds, when the battery level falls below 15%. In an embodiment, the tracking system may also include the ability to single out a tracking device as lost if it cannot be found through the live mapping of the device location. A network of the tracking system may then report if a signal is received from a device singled out as lost.

The tracking system of the present invention may utilize the relation of data elements to efficiently track and locate items. For example, tracking devices may have an identification number that is communicated in all interactions with the tracking system. The tracking device, or more specifically the identification number of a tracking device, may be associated with the vehicle identification number (VIN) of an automobile corresponding to the keys attached to the tracking device. In an embodiment, the VIN can be programmed through the user interface of the mobile or desktop application. In an embodiment, the VIN may also be stored in a programmable memory space on the tracking device, or onboard memory storage, which may be flash memory of the tracking device. The VIN can only be written to the onboard memory storage using an encrypted key held by a system administrator. In an embodiment, the VIN, or any other information stored on the onboard memory storage, cannot be written or manipulated by the end user, but is stored for future retrieval by the system.

This concept of data relation may further be provided by the present disclosure to track and associate a variety of objects or actions. For example, any device that, like the tracking devices discussed herein, may have the capability to convey a unique identification number to the present tracking system may be integrated as part of the system. For example, a car manufacturer may build Bluetooth communication capabilities into their automobile key fobs, giving the key itself the ability to convey a unique identification number to the present tracking system. The unique identifier may be associated with any number of data elements, including an automobile as described herein, or simply a user by way of a user identification number or name, to efficiently associate the tracked and stored location of the unique identification number with the desired data element.

The tracking system of the present invention may further be used to track the location of a user carrying a tracking device. For example, if a tracking device is attached to a user's keys, the tracking device may be used to track the visits of the user to certain establishments. In an embodiment, ownership of the automobile associated with a tracking device may be passed to a user upon purchase of the automobile. When the user returns to the automobile dealership, for instance to the service department, the identification number of the tracking device may be read at the service department and the owner's identifying information, including potential appointments, may be retrieved and displayed for the service technician. A user's visits to certain establishments or businesses may also be tracked as part of a frequency based reward systems. For example, a user's visit to a restaurant or a sporting event while carrying the tracking device may be conveyed to the tracking system and automatically tallied as part of a loyalty or reward system.

With specific reference to FIGS. 1-4, in accordance with one aspect of the technology, the tracking system and method of the present disclosure may include a tracking device 100. Tracking device 100 may be an electronic device that communicates using the Bluetooth or Bluetooth Low Energy (LE) protocol. In an embodiment, tracking device 100 is a Bluetooth LE proximity tag. Tracking device 100 may include a bottom cover 102 disposed below a main body 104. A push button cap 106 or user button may be disposed in a hollow center portion of main body 104 with a button-cap sealer 108 or seal ring disposed between button 106 and main body 104. Main body 104 may also have a light opening 120 through which a light 110 may protrude and be visible to the user. Light 110 may be an LED, or may be any other component suitable for providing visual feedback.

Figure 1:
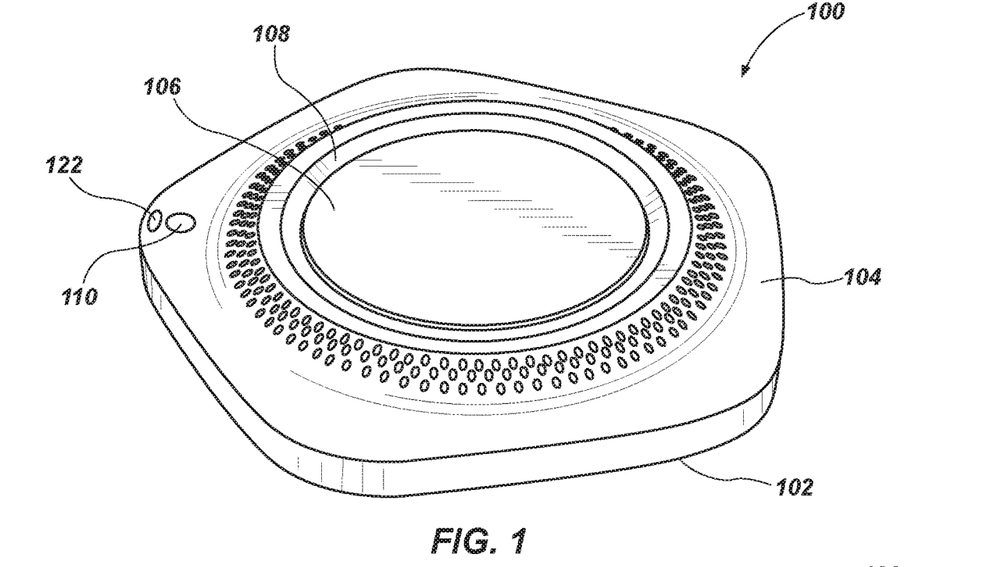
FIG. 1 is a perspective view of a tracking device in accordance with one aspect of the technology.
Figure 2:
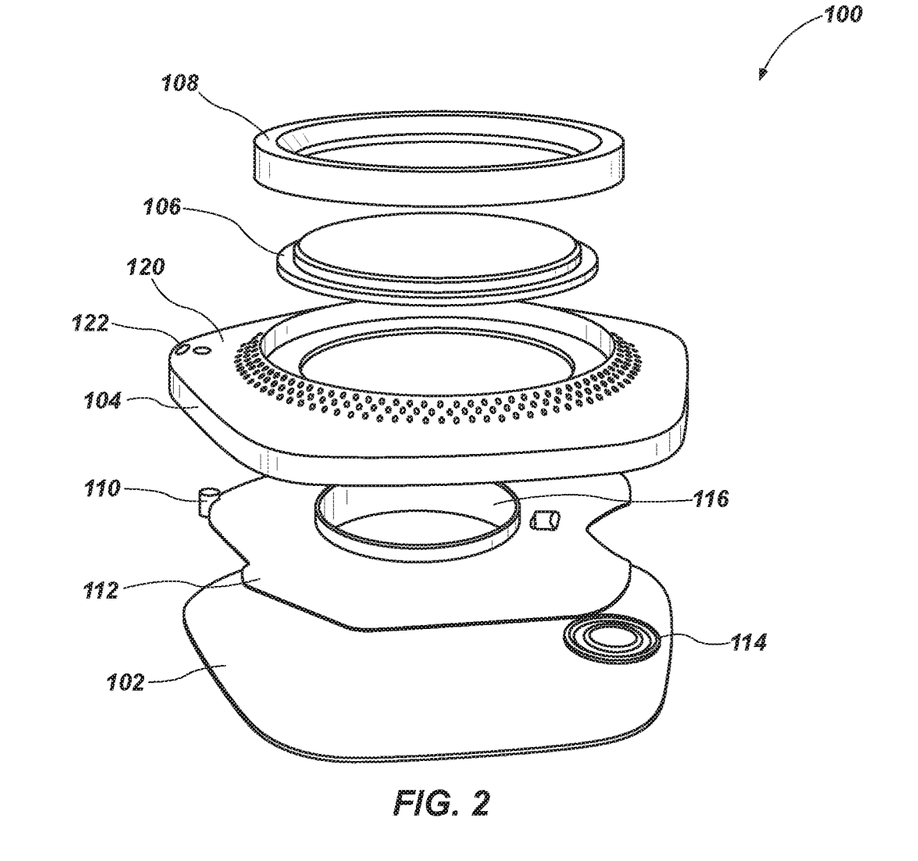
FIG. 2 is an exploded side perspective view of the tracking device of FIG. 1.
Figure 3:
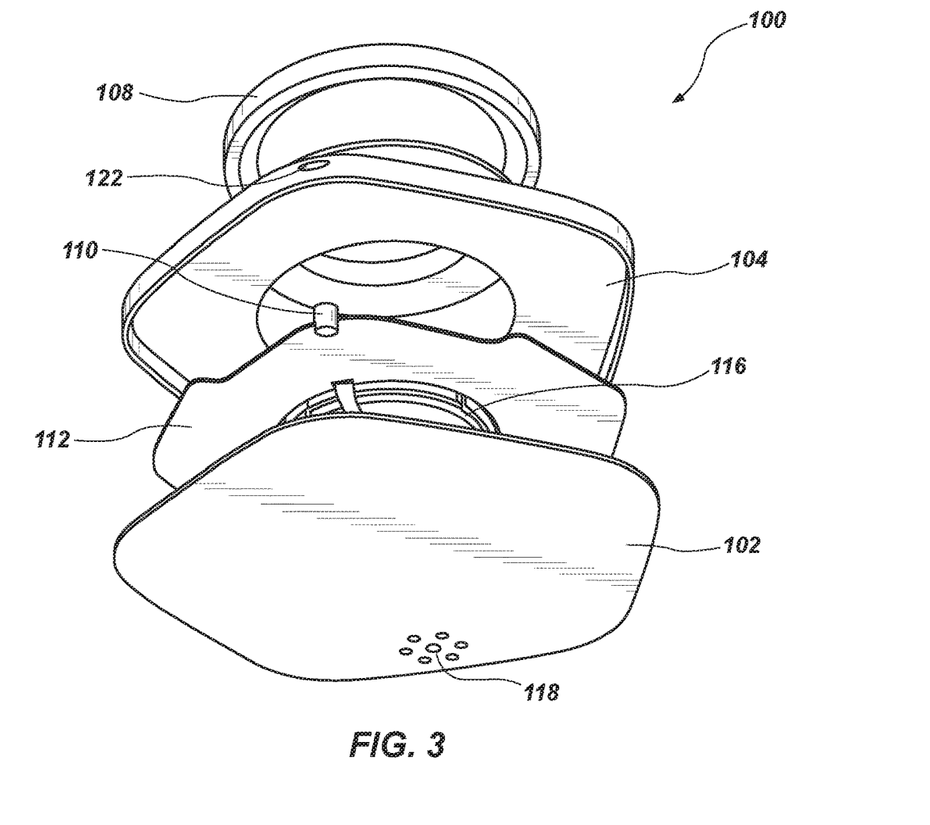
FIG. 3 is an exploded bottom perspective view of the tracking device of FIG. 1.

Enclosed within main body 104 and bottom cap 102 may be a printed circuit board (PCB) 112, upon which light 110 is disposed. A battery 116 may be disposed on a top side of the printed circuit board 112, and may reside below or within the push button cap 106. In an embodiment, printed circuit board 112 may include an opening in which battery 116 resides, with the printed circuit board configured to surround the battery. PCB 112 may generally take the shape of main body 104 to take advantage of all available space enclosed within main body 104 and bottom cap 102, allowing the overall size of tracking device 100 to be minimized. A sound generating buzzer 114 may also be enclosed within main body 104 and bottom cap 102. Sound generating buzzer 114 may be any component suitable of creating an audible alert, such as a buzzing or beeping alert. In an embodiment, buzzer 114 may be disposed on an inside of bottom cap 102, with sound holes 118 disposed within bottom cap 102 adjacent to buzzer 114.

The tracking device 100 of the present disclosure may be water resistant. For example, cap sealer 108 may be configured and adapted to create a water-resistant seal between push button cap 108 and main body 104. Any holes or openings in the body of tracking device 100, including sound holes 118 for buzzer 114, may include water resistant protections, as known in the art. Tracking device 100 may further include structure to allow a user to replace battery 116, or in other words may include a user replaceable battery. Battery 116 may be any battery suitable to provide power based on the specific power and space or dimensional requirements of the tracking device. In an embodiment, battery 116 may be a small lithium ion battery, such as a coin cell battery, as is commonly used in automobile key fobs. In one embodiment, bottom cover 102 and main body 104 may create a water resistant access point to the printed circuit board 112. For example, a re-sealable gasket or other water resistant mechanism could be placed between bottom cover 102 and main body 104 that allows removal of bottom cover 102 from main body 104 while preserving water resistance upon reassembly. With access to the printed circuit board 112, a user may replace battery 116 without requiring outside or professional tools or assistance, and may continue using the tracking device rather than requiring purchase of another, all of which saves the user money, time and other resources.

Figure 4:
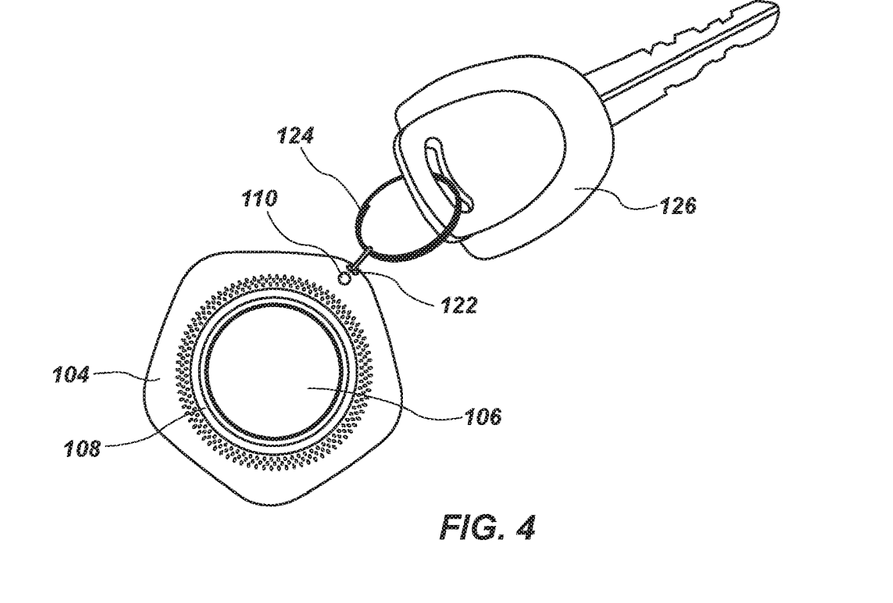
FIG. 4 is a top view of a tracking device attached to an automobile key in accordance with one aspect of the technology.

As described in detail herein, tracking device 100 may be attached to an object, such as an automobile key. Accordingly, tracking device 100 may include an attachment aperture 122. A keyring 124 may cooperate with attachment aperture 122 to attach tracking device 100 to an automobile key 126. In other embodiments, tracking device 100 may attach to other objects using attachment aperture 122 with any attachment structure known in the art. In yet other embodiments, tracking device 100 may attach to an object via adhesion or another attachment mechanism that does not utilize attachment aperture 122.

Tracking device 100 is one of many tracking devices that may be used with the location tracking system of the present disclosure. For example, the present disclosure relates to a location tracking system for automobile keys at an automobile dealership that may include a plurality of tracking devices 100. Each of the plurality of tracking devices 100 may be attached to an automobile key and provide tracking information to a tracking system according to the present disclosure. As described in detail below, the present disclosure also relates to a system and method of location tracking that may utilize a tracking device other than tracking device 100, such as a tracking device using a communication protocol other than Bluetooth LE.

Figure 5:
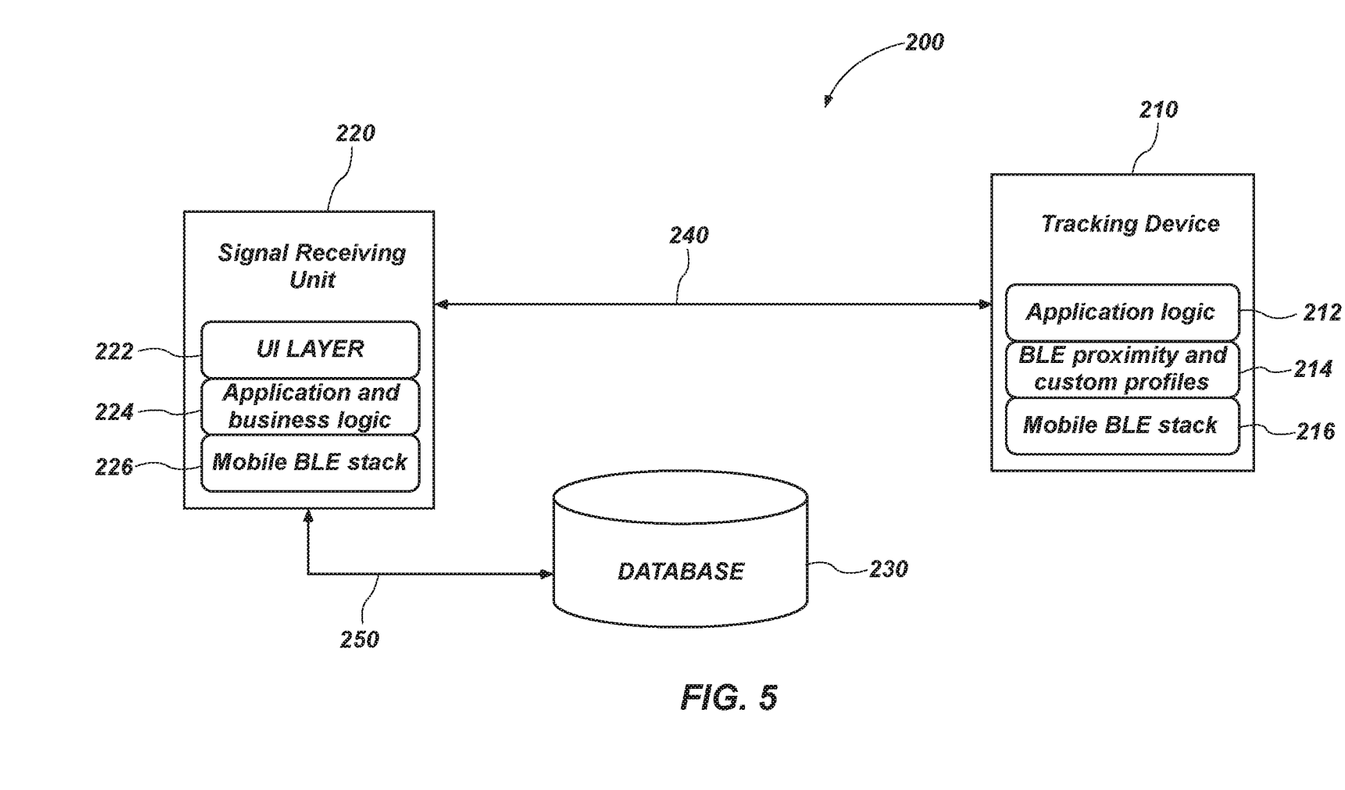
FIG. 5 is a diagram illustrating a tracking system in accordance with one aspect of the technology.

As depicted in FIG. 5, an embodiment of a tracking system 200 according to one aspect of the present technology may include one or more, or a plurality of, tracking devices 210 and one or more signal receiving units 220. Signal receiving units 220 may be configured and adapted to receive an identification number from one of the plurality of tracking devices 210 via a wireless communication protocol 240, such as Bluetooth LE. Signal receiving units 220 may be stationary or fixed, or they may be mobile. For example, signal receiving units 220 may be user mobile devices running a mobile application configured to receive the identification number from tracking devices 210 within range.

Once a tracking device 210 within range sends an identification number to the receiving unit 220, the location of the signal receiving unit 220 at the time the identification number of the tracking device was received, and the identification number of the tracking device, are captured and sent to a location database 230. In other words, the identification number of the tracking device 210 and the location or approximate location of the tracking device 210 as captured from the location of the receiving unit 220, are sent to and recorded in database 230. Each signal receiving unit 220 is connected with database 230 via communication path 250, which may be any form of wired or wireless communication. In an embodiment, signal receiving units 220 send information to database 230 via wi-fi or cellular data connections. In yet other embodiments, signal receiving units 220 may convey information over a wired connection over the internet or via a direct connection to the database, such as through a local area network. In one embodiment of the present technology, if signal receiving unit 220 does not have a connection with database 230 when it receives a signal from tracking device 210, signal receiving unit 220 may be configured to store the location and identification information and transmit the information to database 230 once a connection is restored.

In an embodiment, tracking device 210 may be a Bluetooth device that may include application logic 212, Bluetooth proximity and custom profiles 214, and Bluetooth operating software 216 implementing the Bluetooth protocol, including Bluetooth stacks and HAL. In other words, tracking device 210 may be specially programmed to communicate with the tracking system by way of the specific communication protocol 240 desired, such as Bluetooth or Bluetooth LE.

In an embodiment, signal receiving unit 220 may be a user mobile device running a mobile application, which may include a user interface 222, applications and business logic 224, and Bluetooth operating software 226. In addition to serving as one of the plurality of signal receiving units 220, a mobile application running on a user mobile device may also serve as a display unit for displaying the location of tracking devices, according to aspects of the present technology as discussed below.

The location tracking system of the present disclosure, which tracking system can be used by automobile dealerships to track the location of automobile keys, may also include one or more display units. The display units may be configured to retrieve the location of the plurality of tracking devices and display the location of the plurality of tracking devices on a live map. In an embodiment, the display units of the present disclosure may be the same user mobile devices that are included in the signal receiving units. The mobile application running on the user mobile devices may be configured to have a section for displaying the location of tracking devices while also operating as a signal receiving device, as explained above. The mobile application may also include user settings, configuration or other administrative options for setting up and running the tracking network of the present disclosure. In another embodiment, display units may be desktop computers running desktop applications. In other embodiments, display units may be stand-alone electronic units with screens dedicated to displaying tracked items in the tracking system.

According to the present disclosure, each of the plurality of tracking devices in a tracking system used by a dealership to track automobile keys may be associated with a vehicle identification number (VIN) of an automobile to which the attached automobile key belongs. In other words, the tracking system disclosed herein may be configured to associate the VIN with the identification number of the tracking device, allowing the system to efficiently relate all data and information gathered on the tracking device to the automobile to which it is associated. The VIN of an automobile is often readily viewable from outside of a vehicle, and can be used by dealerships or other users to identify a specific automobile with a specific set of features. Using the location tracking system presently disclosed, a dealership will have the ability to quickly find the keys of a particular automobile based simply on its VIN.

In other embodiments of the invention, an automobile may be associated with an owner who has purchased the automobile from the dealership. With the tracking device associated to the automobile by way of the VIN, the vehicle owner would be directly linked to the tracking device, or in other words, an association would be created between the vehicle owner and the tracking device identification number. Having owner information associated with the tracking device, the signal receiving units of the present tracking systems may be configured to receive the identification information of the owner. In this way, an owner's information may be readily produced and displayed when an owner's tracking device sends a signal to, or is picked up by, the tracking system. For example, a user entering the service center triage of a dealership may be located by the tracking system, and the owner's information, including the service appointment the owner is attending, if any, can be displayed for the service department. In this way, automobile dealerships may deliver a more customized and personal experience.

The location tracking systems of the present disclosure may also include an alert feature that can be selected by a user to activate an alert on a tracking device. For example, a display unit, which may be a user mobile device, may include an option for a user to activate an alert. Activating the alert feature for one of the plurality of tracking devices activates the light and the sound generating buzzer of the tracking device. This alert feature can be especially useful when the location of the tracking device has been narrowed down, but the tracking device is still not found. Sounding an alarm and flashing a light can also be helpful when multiple tracking devices are located in close proximity, such as in a pile or hanging in a row, as is often the case with nearly identical automobile keys at an automobile dealership.

In situations where the automobile ownership has been transferred and the owner has been associated with the tracking device, the system of the present disclosure may include granting the owner of the automobile access to the tracking device location and the alert feature for activating an alert on the tracking device associated with the automobile. The user could access this information and these features through a mobile application on a user mobile device, as described herein.

The location tracking systems of the present invention further may include the ability to change the advertising rate of the tracking devices, or the rate at which the tracking devices broadcast or attempt to transmit a signal. In an embodiment, the advertising rate of each of the plurality of tracking devices can be adjusted from the one or more display units, such as the user mobile device running the mobile application. The tracking devices of the present disclosure may be set to a default advertising or broadcast rate, such as 250 milliseconds, which means a signal will be broadcast from the device once every 250 milliseconds. The advertising interval may be adjusted from within the system, where increasing the interval or frequency of transmission may lead to more accuracy or greater discoverability and decreasing the interval or frequency of transmission may conserve battery. For example, the advertising interval may be adjustable within a range of 100 milliseconds to 2500 milliseconds. As will be appreciated by those of skill in the art, different applications will call for different advertising rates. In an application where either the signal receiving units or the tracking devices are expected to move relative to each other, a slow broadcasting interval of once every 2.5 seconds may be too slow to accurately measure the location of the tracking device. In some instances, such as where the user mobile device comprising the receiving unit is moving at a high rate of speed, such a slow broadcast interval may prevent detection of the tracking device altogether. However, in other applications, a slower interval and its corresponding savings in battery life may be desirable.

Figure 6:
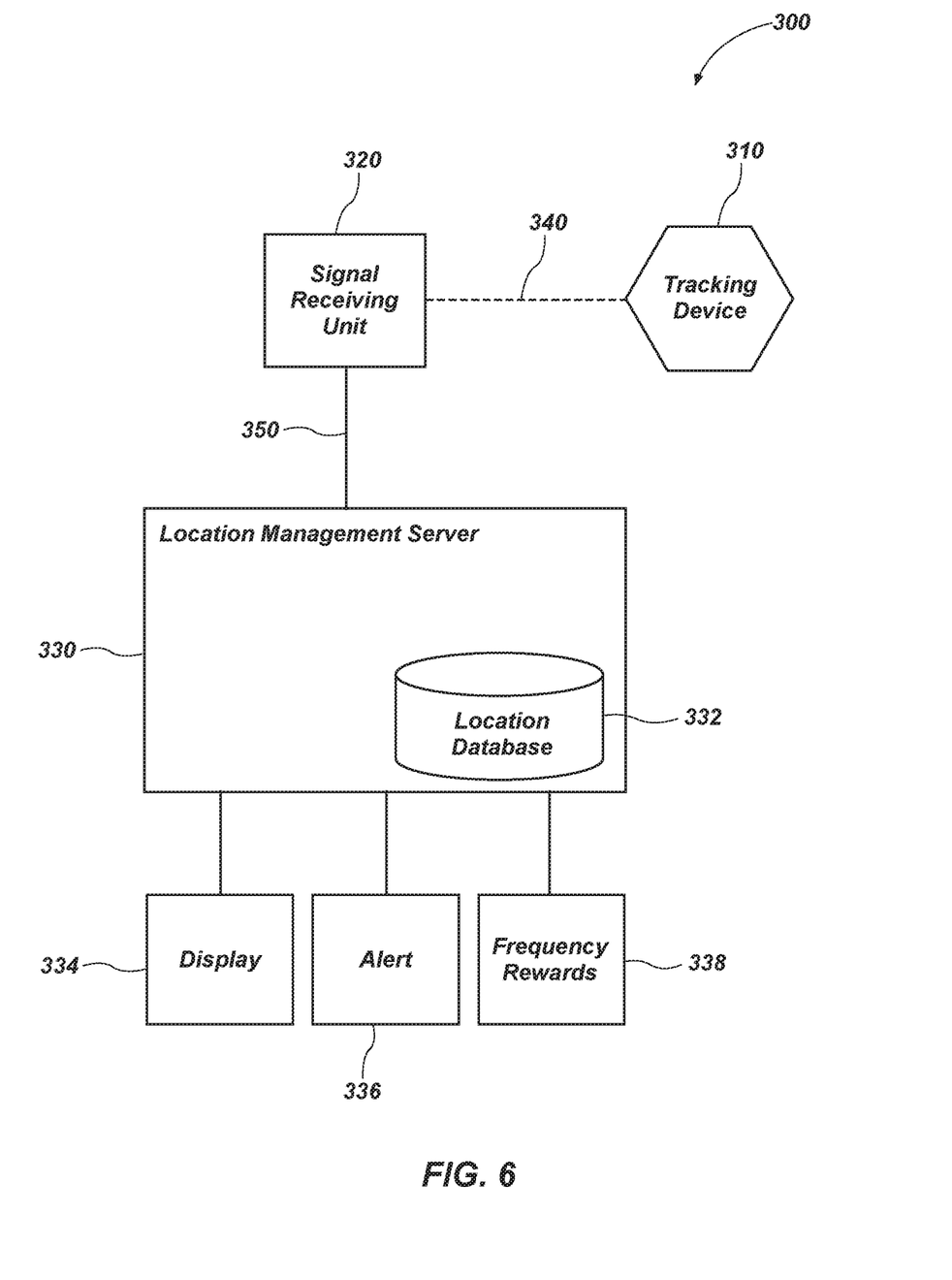
FIG. 6 is a diagram illustrating a tracking system in accordance with one aspect of the technology.

As depicted in FIG. 6, and similar to the system previously discussed herein, a location tracking system 300 may include a plurality of tracking devices 310 that may be Bluetooth Low Energy tags. The tracking system 300 may also include a plurality of signal receiving units 320, each configured to receive an identification number of each of the plurality of tracking devices 310 or Bluetooth Low Energy tags in proximity to the signal receiving unit 320. Signal receiving units 320 may embody a user mobile device, or may be a Bluetooth receivers disposed at and around participating business locations. The tracking devices may communicate with the signal receiving units over a wireless communication path 340, which may include the Bluetooth protocol, as discussed herein.

Location tracking system 300 may also include a location management server 330 configured and adapted to receive the location of the signal receiving unit 320 at the time the identification number of the tracking device 310 was received by the signal receiving unit 320. In other words, the location management server 330 will receive and store the identity and location of a tracking device 310, with the location approximated based on the location of the signal receiving unit 320 that received the broadcast from the tracking device 310. Location management server 330 may also associate the identification number from the tracking device 310 with a user, who may access location information or share such information with other applications or for other uses via a secure login, or other access and privacy-controlled means.

The location tracking system 300 may also include a user mobile application having a display feature 334, an alert feature 336 and a frequency rewards feature 338. Display feature 334 may be configured to retrieve the location of each of the tracking devices associated with the user from the location management server and display the location of the tracking devices on a live map. Alert feature 226 may be configured to select one of the tracking devices 310 that may be associated with the user and activate the light and the sound generating buzzer of the tracking device 310. Frequency rewards feature 338 may be configured to retrieve the number of user visits to select locations from the location management server and display rewards earned based on the number of user visits.

Rewards or loyalty programs are a well-known marketing tool for a business to encourage consumers to frequent or make purchases from the business. The technology of the present disclosure provides, in combination with the features and benefits already discussed in detail, a system for tracking a user's visits to select locations. The frequency or number of visits to a location can be used by a business to provide a loyalty benefit or a reward based on the number of visits. In an embodiment, the frequency rewards feature 338 may access visit information regarding the frequency of a user's visit to a select location from the location management server 330. In an embodiment, frequency rewards feature 338 may display the number of visits, rewards or loyalty benefits, and potential rewards or benefits, within a mobile application on a user mobile device. For example, frequency rewards feature 338 may comprise the same user mobile device as display feature 334 and alert feature 336. In an embodiment, frequency rewards feature 338, display feature 334 and alert feature 336 are built into the same mobile application operating on a user mobile device. In other embodiments, frequency rewards feature 338, display feature 334 and alert feature 336 may each be built into or comprise separate mobile applications.

In the event that a tracking device 310 cannot be located via the display feature 334 or the alert feature 336, the tracking device 310 may be designated in the system, or in the location management server 330, as lost. Thereafter, any signal received at a receiving unit 320 from the tracking device 310 marked as lost may be flagged or otherwise noted at the location management server 330. Location tracking system 300 may activate an alert to the user that designated the tracking device 310 as lost, telling the user that the device has been located and providing the approximate location. In this way, tracking system 300 continues to operate normally, without needing to push information regarding lost tracking devices to receiving units in its system, but rather can identify lost tracking devices at the server level when signals are received from receiving units.

Location tracking system 300 may further include a vehicle maintenance feature and a dealership messaging feature, which may each be features built into a user mobile application. The vehicle maintenance feature may be configured to track vehicle maintenance and alert the user of upcoming recommended vehicle maintenance. The vehicle maintenance feature may communicate with and use information from location tracking server 330 to maintain records and generate alerts. The vehicle maintenance feature may also be configured to communicate with an automobile dealership's system and records on customers and service performed when producing service records and generating alerts for a user.

The dealership messaging feature may be configured to facilitate communication between the user and an automobile dealership. For example, the dealership messaging feature may allow a user to open an online, instant messaging conversation with a dealership to discuss sales, parts, service or any other desired inquiry. In an embodiment, the dealership may be able to generate and push alerts to a user mobile device with information on deals or reminders on upcoming service appointments, among other information. The messaging feature may also include the ability to facilitate delivery of other written messages such as emails, or voice recorded messages, all as known in the art.

Having a built-in messaging feature as part of a location tracking system may provide great benefits to both a business user and the consumer end user. A business, such as an automobile dealership, may be granted access to certain information on certain users from the location tracking system, such as the user's frequency of visits to an establishment. The business may further facilitate setting appointments with an end user by being granted access by a user to a user's schedule, such as could be shared from a user's calendar or scheduling application on a mobile device, or as could be developed from the user's tracked location information. A variety of benefits and additional applications of the present technology will be understood to those of skill in the art.

Figure 7:
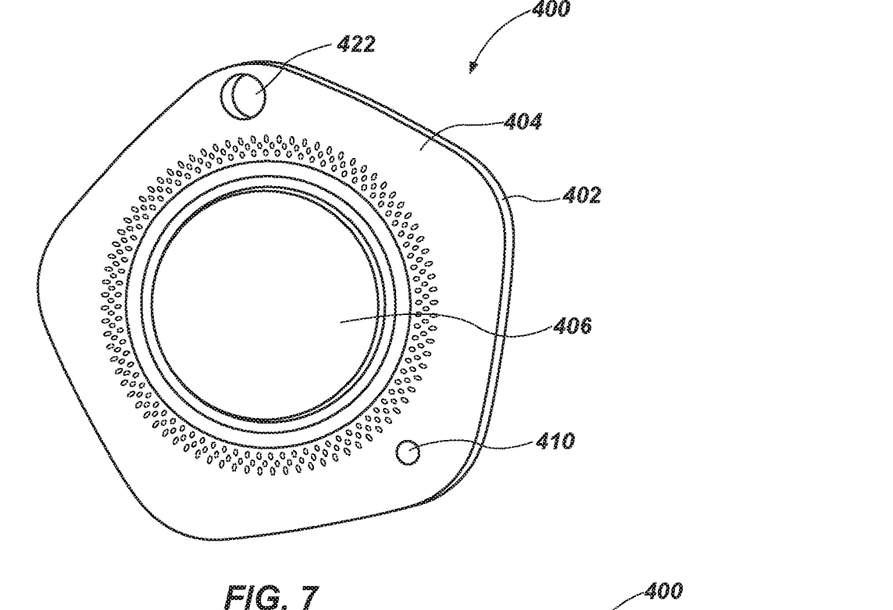
FIG. 7 is front perspective view of a tracking device in accordance with another aspect of the present technology.
Figure 8:
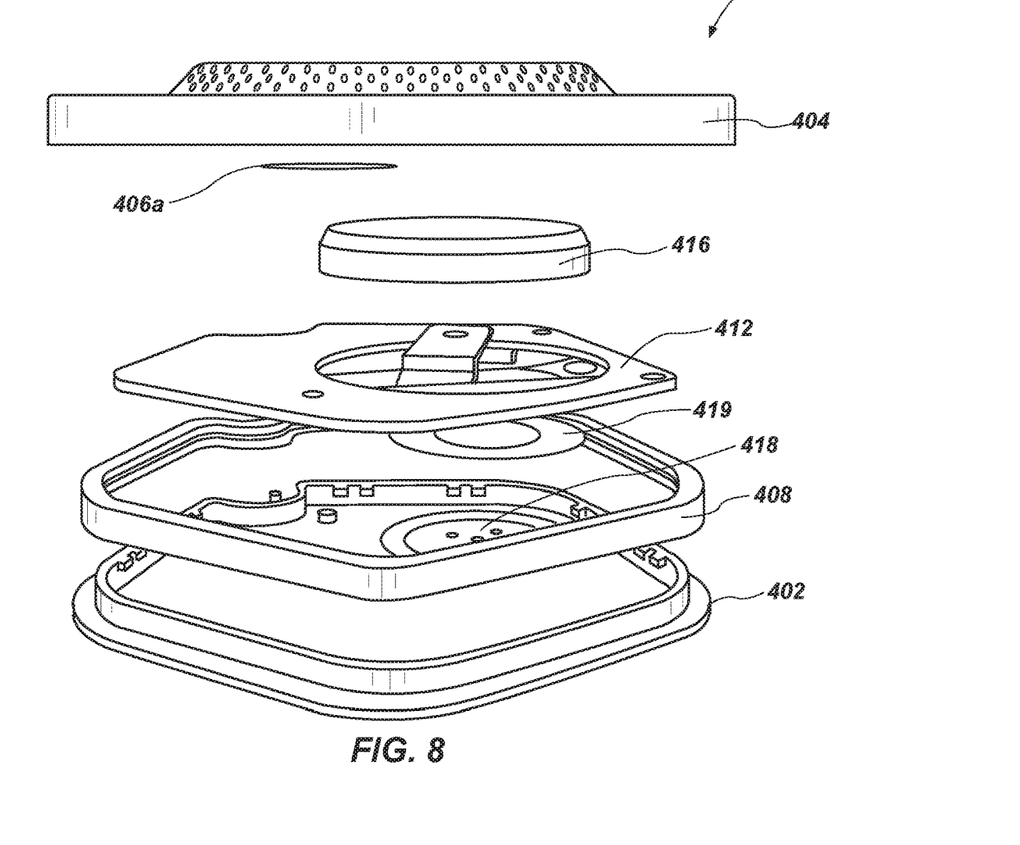
FIG. 8 is an exploded side perspective view of the tracking device of FIG. 7.

Referring now to FIGS. 7-8, in yet another embodiment of the present disclosure, a tracking device 400 may include a bottom cover 402 disposed below a main body 404. A push button cap 406 or user button may be disposed in a hollow center portion of the main body 104. A button cap spacer 406a may reside between button cap 406 and a battery 416. Button cap spacer 406a may facilitate contact with battery 416 when button cap 406 is pressed, which may activate the features of tracking device 400, as described herein. A perimeter seal 408 may be disposed between bottom cover 402 and main body 404, which seal 408 may provide dust and water resistance, while allowing for user-replacement of the battery. In an embodiment, tracking device 400 may not include a seal or any opening around button cap 406. Button cap 406 may be formed as a single, but flexible, piece of main body 404.

Tracking device 400 also includes a printed circuit board 412 which may include an opening in which batter 416 resides. A buzzer 419 is disposed on printed circuit board 412 above sound holes 418 in bottom cap 402. As described herein, buzzer 419 may be activated as part of an alert, along with a light 410, which may be an LED. Tracking device 400 may also include an attachment aperture 422. Printed circuit board 412 may include cutouts, or may take a shape, that allows for aperture 422 to be enlarged to more easily accept a variety of attachment structures, such as keyrings of differing sizes. Accordingly, the stackup and internal design of components of tracking device 400 may be configured to minimize the size of tracking device 400 while accommodating features such as the buzzer, the LED, and the attachment aperture.

As will be appreciated by those of ordinary skill in the art, the systems of the present technology provide a foundation of location tracking that can be applied to a variety of applications. A single location tracking system may include a key tracking system having tracking devices associated with the VIN of corresponding automobiles, where the subject automobiles will be associated with owners after purchase, which owners may carry the tracking devices on their automobile keys and use a mobile application to track the location of their keys, activate an alert to find lost keys, and track their loyalty benefits or rewards tallied from visiting participating business establishments. In other embodiments, a location tracking system may be used only by a dealership to track the location of the automobile keys associated to the VIN of corresponding automobiles. In yet other embodiments, the tracking system of the present disclosure may not include an automobile dealership, but rather may be used by other business or simply by consumers to track the location of pets, children, vehicles, or other objects and items, including valuable items such as electronics.

The present disclosure also relates to various methods of location tracking, including a method of tracking the location of automobile keys at an automobile dealership. The tracking method may include attaching a tracking device to each automobile key or set of automobile keys. The tracking device may be a Bluetooth Low Energy tag, and may include a button, a light, a sound generating buzzer, and a user replaceable battery. The tracking method may also include associating an identification number of the tracking device with the vehicle identification number of an automobile to which the attached automobile key belongs. The next step of the method may be receiving the tracking device identification number at a signal receiving unit, which may be a user mobile device. The signal receiving unit may then transmit the tracking device identification number and the location of the signal receiving unit at the time the tracking device identification number was received to a location management server.

According to the location tracking method of the present technology, the tracking device identification number and the location of the tracking device may then be stored in a database. With the stored information, the method may include recalling the location of the tracking device from the location database to displaying the location of the automobile's keys on a live map in response to a request from a user. The location may be displayed on a user mobile device, which may be the same user mobile device embodying the signal receiving unit. Furthermore, the user's request for location information may, in some embodiments, be based on or include only the vehicle identification number of the automobile.

For example, the present method may include the relation of data elements to efficiently retrieve location information, as detailed herein. The method may include associating a unique tracking identification number with any identifying information of the person, item or object to be tracked, including the VIN of an automobile, the username of a user, or any other identifier of an object, such as a serial number or MAC address of an electronic device. In this way, the tracking method may pull the location of the tracked item based on the relation between the identification of the tracked item and the unique identification number of the tracking device.

The location tracking method may also include activating the light and the sound generating buzzer of the tracking device upon activation of an alert feature. In an embodiment, the method includes associating the vehicle identification number of the automobile with the owner of the automobile upon purchase, after which identifying information of the owner of the automobile may be displayed when the automobile enters a portion of a dealership having a receiving unit. For example, when the user pulls into a service center triage at a dealership, the method may include displaying the user's identifying information and appointment information for a service technician to greet the user. In an embodiment of the present track In another embodiment of the present technology, a method of location tracking, may include receiving a signal comprising an identification number of a tracking device at a receiving unit. The method may then include transmitting the tracking device identification number and the location of the receiving unit to a location management server, associating the tracking device identification number with an identifier of an object, and storing the location of the tracking device in a location database. According the location tracking method, the location of the tracking device may then be produced in response to a request for the location of the object. Because the object has been associated with the tracking device identification number, the location of the object is assumed to be, and can be efficiently pulled from, the location of the tracking device.

In this location tracking method, the step of producing the location of the tracking device may further include displaying the location of the tracking device on a live map. The location may be delivered to, or the location displayed on, a user mobile device. The same user mobile device may be the receiving unit that receives the tracking device identification number. The method may include deploying a network or system of receiving units, either user mobile devices or stationary receiving units, such that a tracking device at a distance from one mobile device receiving unit may still be located by other receiving units, and its location displayed on the distant mobile device. The method may also include sending a signal to the tracking device to activate an alert on the tracking device. The alert may be sent from a user mobile device, and the alert may include at least one of a sound, or audible alert, and a light, or visible alert.

The foregoing detailed description describes the technology with reference to specific exemplary aspects. However, it will be appreciated that various modifications and changes can be made without departing from the scope of the present technology as set forth in the appended claims. The detailed description and accompanying drawings are to be regarded as merely illustrative, rather than as restrictive, and all such modifications or changes, if any, are intended to fall within the scope of the present technology as described and set forth herein.

More specifically, while illustrative exemplary aspects of the technology have been described herein, the present technology is not limited to these aspects, but includes any and all aspects having modifications, omissions, combinations (e.g., of aspects across various aspects), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the technology should be determined solely by the appended claims and their legal equivalents, rather than by the descriptions and examples given above.

The invention claimed is:

1. A location tracking system, comprising:
   a plurality of Bluetooth Low Energy tags;
   a plurality of signal receiving units, each configured to receive an identification number of each of the plurality of Bluetooth Low Energy tags in proximity to the signal receiving unit;
   a location management server configured and adapted to receive the location of the signal receiving unit at the time the identification number of the tracking device was received by the signal receiving unit and associate the identification number with a user; and,
   a user mobile application comprising:
     a display feature configured to retrieve the location of each of the tracking devices associated with the user from the location management server and display the location of the tracking devices on a live map;
     an alert feature configured to select a tracking device associated with the user and activate the light and the sound generating buzzer of the tracking device; and
     a frequency rewards feature configured to retrieve the number of user visits to select locations from the location management server and display rewards earned based on the number of user visits.

2. The system of claim 1, wherein the plurality of signal receiving units comprises user mobile devices with the user mobile application installed.

3. The system of claim 1, wherein the plurality of signal receiving units comprises Bluetooth receivers disposed at participating business locations.

4. The system of claim 1, wherein the user mobile application further comprises a vehicle maintenance feature configured to track vehicle maintenance and alert the user of upcoming recommended vehicle maintenance.

5. The system of claim 1, wherein the user mobile application further comprises a dealership messaging feature configured to facilitate communication between the user and an automobile dealership.

6. The system of claim 1, wherein each of the plurality of Bluetooth Low Energy tags comprises a button, a light, a sound generating buzzer, and a user replaceable battery.

* * * * *